United States Patent
Chatani

(10) Patent No.: US 8,423,540 B2
(45) Date of Patent: Apr. 16, 2013

(54) RELATED INFORMATION PRESENTATION SYSTEM, RELATED INFORMATION PRESENTATION METHOD, AND INFORMATION STORAGE MEDIUM

(75) Inventor: Masayuki Chatani, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 280 days.

(21) Appl. No.: 12/478,928

(22) Filed: Jun. 5, 2009

(65) Prior Publication Data

US 2010/0017396 A1    Jan. 21, 2010

(30) Foreign Application Priority Data

Jul. 16, 2008   (JP) ................................. 2008-185431

(51) Int. Cl.
*G06F 17/30* (2006.01)
(52) U.S. Cl.
USPC ........................... 707/726; 707/767; 705/26.7
(58) Field of Classification Search .................. None
See application file for complete search history.

(56) References Cited

U.S. PATENT DOCUMENTS

| | | | | |
|---|---|---|---|---|
| 7,188,101 B2 * | 3/2007 | Smyth | .................................. | 1/1 |
| 7,634,737 B2 * | 12/2009 | Beringer et al. | .............. | 715/764 |
| 2002/0024532 A1 * | 2/2002 | Fables et al. | .................. | 345/700 |
| 2004/0039657 A1 * | 2/2004 | Behrens et al. | ................. | 705/26 |
| 2004/0260621 A1 * | 12/2004 | Foster et al. | ..................... | 705/26 |
| 2005/0071251 A1 * | 3/2005 | Linden et al. | .................... | 705/26 |
| 2006/0136284 A1 * | 6/2006 | Awerbuch et al. | .............. | 705/10 |
| 2008/0209325 A1 * | 8/2008 | Suito et al. | ..................... | 715/719 |
| 2008/0313673 A1 * | 12/2008 | Morris | ............................ | 725/40 |
| 2009/0006290 A1 * | 1/2009 | Gunawardana et al. | ......... | 706/14 |
| 2009/0259632 A1 * | 10/2009 | Singh | ................................ | 707/3 |
| 2009/0259646 A1 * | 10/2009 | Fujita et al. | ....................... | 707/5 |

FOREIGN PATENT DOCUMENTS

JP    2001-265853    9/2001

* cited by examiner

*Primary Examiner* — Anteneh Girma
(74) *Attorney, Agent, or Firm* — Katten Muchin Rosenman LLP

(57) ABSTRACT

In order to give a presentation of related information that unexpected a user, while maintaining some relevance to certain information, a method includes: a link information application step of applying any one of a plurality of link information items stored in a link information storage section for storing the plurality of link information items each associating one or more information items with one or more information items to select an information item related to a given information item; an information acquisition step of acquiring an information item which serves as a base point; a related information selection step of selecting, by repeatedly executing the link information application step a plurality of times, an information item which is indirectly related to the information item acquired in the information acquisition step; and an information presentation step of presenting the information item selected in the related information selection step to a user.

11 Claims, 6 Drawing Sheets

| LINK ID | SOURCE ITEM | TARGET ITEM | EXPLANATION | ATTRIBUTE DATA |
|---------|-------------|-------------|-------------|----------------|
| 001 | ○○ BEER | ○× GLASS | ------- | ----- |
| 002 | ○○ BEER | ×× STOMACH MEDICINE | ------- | ----- |
| 003 | ×× STOMACH MEDICINE | △△ DRINK | ------- | ----- |
| 004 | △△ DRINK | □□ GUIDEBOOK | ------- | ----- |
| 005 | △△ DRINK | □□ SPORTSWEAR | ------- | ----- |

FIG.5

| LINK ID | SOURCE INFORMATION | ITEM FLAG | TARGET INFORMATION | ITEM FLAG | EXPLANATION | ATTRIBUTE DATA |
|---|---|---|---|---|---|---|
| 00001 | ○○ BEER | 1 | STOMACH MEDICINE | 0 | IN THE 1950S, ○○ BEER WAS CONSIDERED USEFUL AS STOMACH MEDICINE. | ----- |
| 00002 | ○○ BEER | 1 | PIZZA | 0 | IN X DISTRICT, ○○ BEER IS DRUNK WHEN EATING PIZZA. | ----- |
| 00003 | ○○ BEER | 1 | ○× GLASS | 1 | ----- | ----- |
| 00004 | STOMACH MEDICINE | 0 | ○○ BEER | 1 | ----- | ----- |
| 00005 | STOMACH MEDICINE | 0 | TOKYO | 0 | ----- | ----- |
| 00006 | STOMACH MEDICINE | 0 | △△ DIGESTIVE MEDICINE | 1 | ----- | ----- |
| 00099 | TOKYO | 0 | □□ SHOES | 1 | ----- | ----- |

RELATED INFORMATION PRESENTATION SYSTEM, RELATED INFORMATION PRESENTATION METHOD, AND INFORMATION STORAGE MEDIUM

BACKGROUND OF THE INVENTION

1. Field of the Invention

The present invention relates to a related information presentation system, a related information presentation method, and an information storage medium, and more particularly, to presentation of related information to a user.

2. Description of the Related Art

Conventionally, there is known an electronic commerce system in which a related item is introduced to a user who has purchased a certain item (see JP 2001-265853 A). With such a system, an unpurchased other item linked to a purchased item is presented to a user, which therefore increases the chance of selling items.

SUMMARY OF THE INVENTION

In the above-mentioned related art, an unpurchased item, which is directly related to a purchased item, is selected, and then presented to the user. Thus, the related art has the advantage of being able to avoid introducing, to the user, an item with little relevance. However, there is a problem that the related art is not suitable for stimulating the potential appetite for shopping, through the introductions of unexpected items to the user. Besides, apart from item information, such a problem may similarly occur in providing various kinds of information, such as content information like music, movies, and games, and service information like real estate and tourism.

The present invention has been made in view of the above-mentioned problem, and has an object to provide a related information presentation system, a related information presentation method, and an information storage medium, which are capable of presenting related information which is unexpected for a user, while maintaining some relevance to certain information.

In order to solve the above-mentioned problem, a related information presentation system according to the present invention includes: link information storage means for storing a plurality of link information items each associating a plurality of information items with one another; link information application means for applying any one of the plurality of link information items stored in the link information storage means to select an information item related to a given information item; information acquisition means for acquiring an information item which serves as a base point; related information selection means for selecting, by repeatedly using the link information application means a plurality of times, an information item which is indirectly related to the information item acquired by the information acquisition means; and information presentation means for presenting the information item selected by the related information selection means to a user.

Further, a related information presentation method according to the present invention includes: a link information application step of applying any one of a plurality of link information items stored in link information storage means for storing the plurality of link information items each associating a plurality of information items with one another to select an information item related to a given information item; an information acquisition step of acquiring an information item which serves as a base point; a related information selection step of selecting, by repeatedly executing the link information application step a plurality of times, an information item which is indirectly related to the information item acquired in the information acquisition step; and an information presentation step of presenting the information item selected in the related information selection step to a user.

Further, an information storage medium according to the present invention is an information storage medium recorded with a program for causing a computer to function as: link information application means for applying any one of a plurality of link information items stored in link information storage means for storing the plurality of link information items each associating a plurality of information items with one another to select an information item related to a given information item; information acquisition means for acquiring an information item which serves as a basing point; related information selection means for selecting, by repeatedly using the link information application means a plurality of times, an information item which is indirectly related to the information item acquired by the information acquisition means; and information presentation means for presenting the information item selected by the related information selection means to a user.

BRIEF DESCRIPTION OF THE DRAWINGS

In the accompanying drawings:

FIG. 5 is a diagram illustrating a modification example of the link information;

DETAILED DESCRIPTION OF THE INVENTION

Hereinbelow, embodiments of the present invention are described with reference to the drawings.

[First Embodiment]

Figure 1:
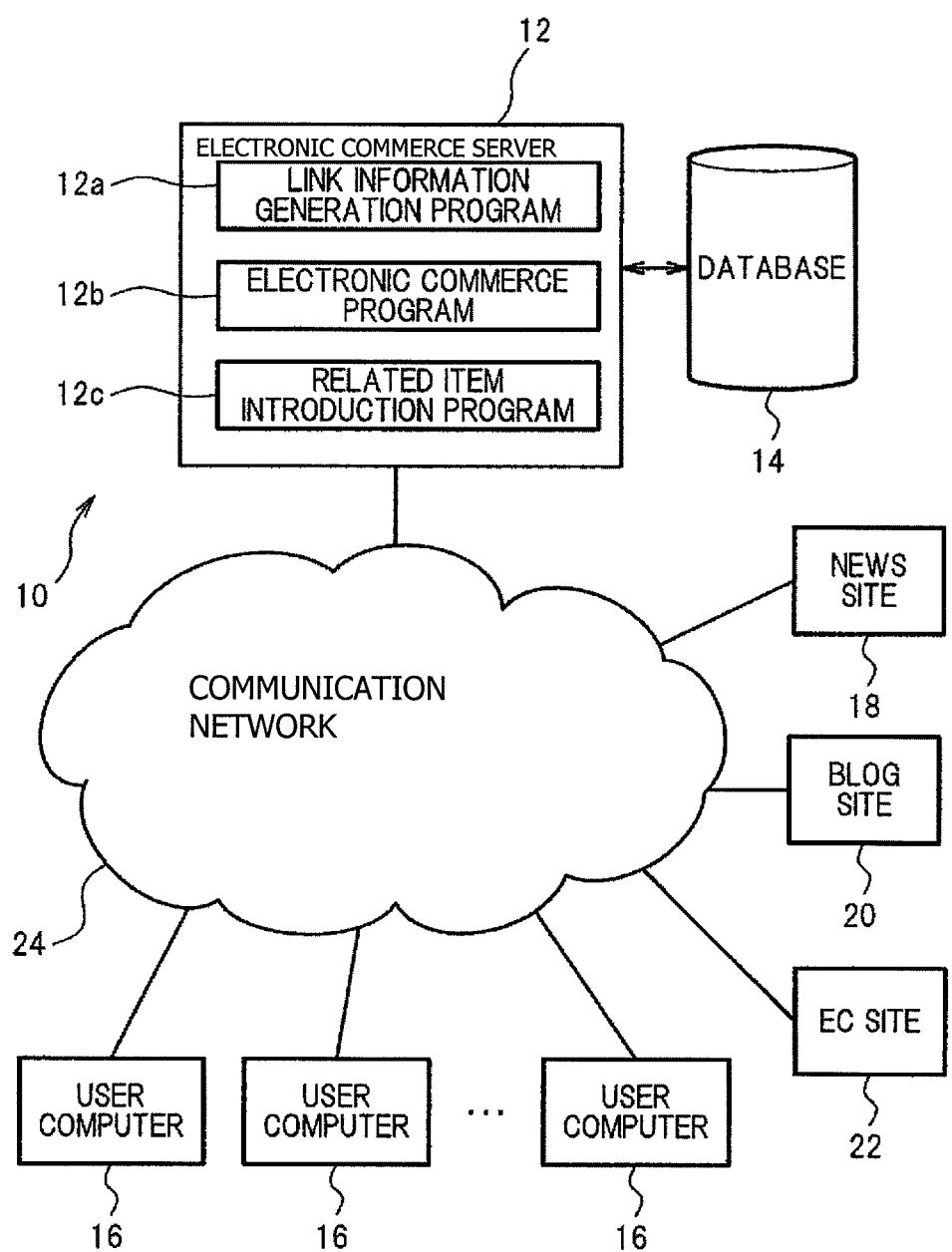
FIG. 1 is a configuration diagram of a related information introduction system according to embodiments of the present invention.

FIG. 1 is a configuration diagram of a related information presentation system according to a first embodiment of the present invention. As illustrated in FIG. 1, a related information presentation system 10 includes an electronic commerce server 12 configured using a known server computer, and a database 14 configured using a known mass storage device and connected to the electronic commerce server 12 via a local area network. The electronic commerce server 12 is connected to a communication network 24 such as the Internet, and further, a user computer 16 used by each of a large number of users is also connected to the communication network 24. The user computer 16 is capable of accessing the electronic commerce server 12 via the communication network 24 to receive electronic commerce service. Further, the electronic commerce server 12 is capable of data communications with a news site 18, a blog site 20, another electronic commerce site 22, and other sites, which are connected to the communication network 24. Those sites are configured using known server computers, and deliver a news article, a blog article, item information, and the like in response to requests made from the electronic commerce server 12 and the user computer 16.

The electronic commerce server 12 is installed with a link information generation program 12a, an electronic commerce program 12b, and a related item introduction program 12c. Those programs may be stored in various kinds of computer-readable storage media including a CD-ROM and a DVD-ROM (not shown), and may be installed into the electronic commerce server 12 from the media. Alternatively, the programs may be downloaded from other computers via the communication network 24. In addition to various kinds of information necessary for carrying out electronic commerce such as item names, prices, and quantity in stock, the database 14 stores a large number of link information items linking items to one another, which are used to introduce a related item of an item purchased by a user.

Figures 2, 3:
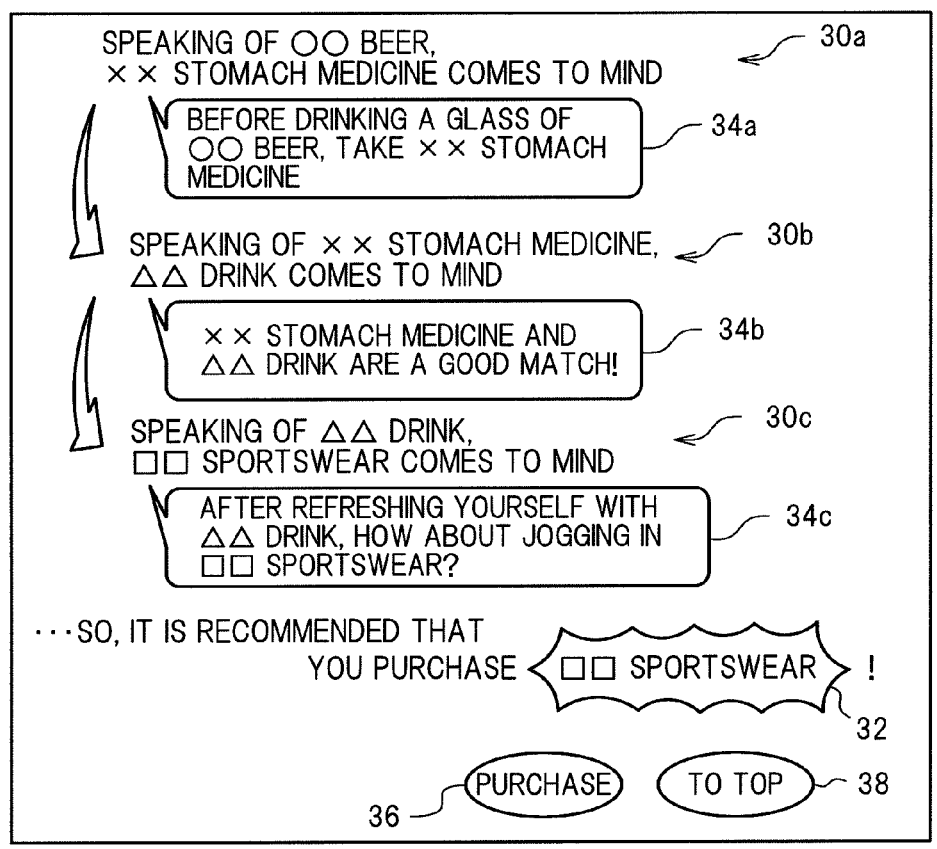
FIG. 2 is a diagram illustrating an example of link information.
FIG. 3 is a diagram illustrating an example of an introduction screen.

In accordance with contents of the database 14, the electronic commerce server 12 provides information on a purchasable item to the user computer 16 by using the electronic commerce program 12b, and when the user gives an instruction to purchase an item, carries out settlement processing. Further, the link information generation program 12a accesses such various kinds of computers as the news site 18, the blog site 20, and the electronic commerce site 22 to thereby collect various information (analysis object information) therefrom. Then, based on the collected analysis object information, the link information generation program 12a generates a large number of link information items which link items to one another, and stores those link information items in the database 14. FIG. 2 schematically illustrates the link information stored in the database 14. As illustrated in FIG. 2, each link information item associates with one another a link ID for uniquely identifying an link information item, source information indicating one item linked using the link information item, target information indicating another item linked using the link information item, an explanatory text indicating why the source information is related to the target information, and attribute data indicating what user is likely to be convinced by the linking using the link information item. For example, item names stored in the database 14 are retrieved from among the analysis object information, and then a search is conducted for such a text that two of the item names are used within a predetermined interval of characters or words. Then, when such a text is present, data which has not been used yet as any "link ID" is newly generated and set as a new "link ID", with one of the two items being a "source item" and the other being a "target item". Further, the retrieved text is set as an "explanation". In addition, the analysis object information containing the retrieved text is analyzed to know what word is constituting the analysis object information, whereby an attribute such as "sports", "literature", "science", or "cooking" is determined. This attribute is set as "attribute data". It should be noted that the link information items do not need to be generated automatically by the link information generation program 12a as described above, and some or all of them may be set manually. Further, when a text containing two item names is found, not only the link information item which sets one of the two items as the "source item" and the other as the "target item" but also another link information item which sets the one of the two items as the "target item" and the other as the "source item" may be generated conversely.

The related item introduction program 12c is a program which selects, when the user purchases an item, an item indirectly related to the item, and presents the selected item to the user. FIG. 3 is an example of an introduction screen which is displayed on a display of the user computer 16 and presented to the user. As illustrated in FIG. 3, the introduction screen includes a plurality of link texts 30a-30c each reading "Speaking of . . . , . . . comes to mind", explanatory texts 34a-34c which are respectively displayed below each of the link texts 30a-30c and each indicate a detailed description for the link texts 30a-30c, and a related item name 32 indicating an item which the user is eventually recommended to purchase. The introduction screen further includes a purchase button 36 which is to be pressed when the user purchases the item indicated by the related item name 32, and a return ("TO TOP") button 38 which is to be pressed when the user does not purchase the item. It should be noted that when the purchase button 36 is pressed using a pointing device such as a mouse, the electronic commerce processing including the settlement processing and other processing is executed by the electronic commerce program 12b with regard to the item associated with the related item name 32. The related item introduction program 12c searches for a link information item in which the item purchased by the user (information serving as a source) is set in the entry of the "source item", and then reads out the entry of the "target item" of the link information item. Further, the related item introduction program 12c searches for a link information item in which the read-out item name is set in the entry of the "source item", and then reads out the entry of the "target item" of the link information item. In this manner, the link information items are applied a number of times that is set in advance (e.g., three times) to convert item names (e.g., three times), whereby an item name eventually acquired is determined as an item indirectly related to the item purchased by the user.

As the related item name 32 of the introduction screen, the name of an item thus determined is embedded. Each of the link texts 30a is generated using the name set in the entries of the "source item" and the "target item" of the link information item used for the conversion of the item name. Each of the explanatory texts 34a is generated using a text set in the entry of the "explanation" of the link information item.

Figure 4:
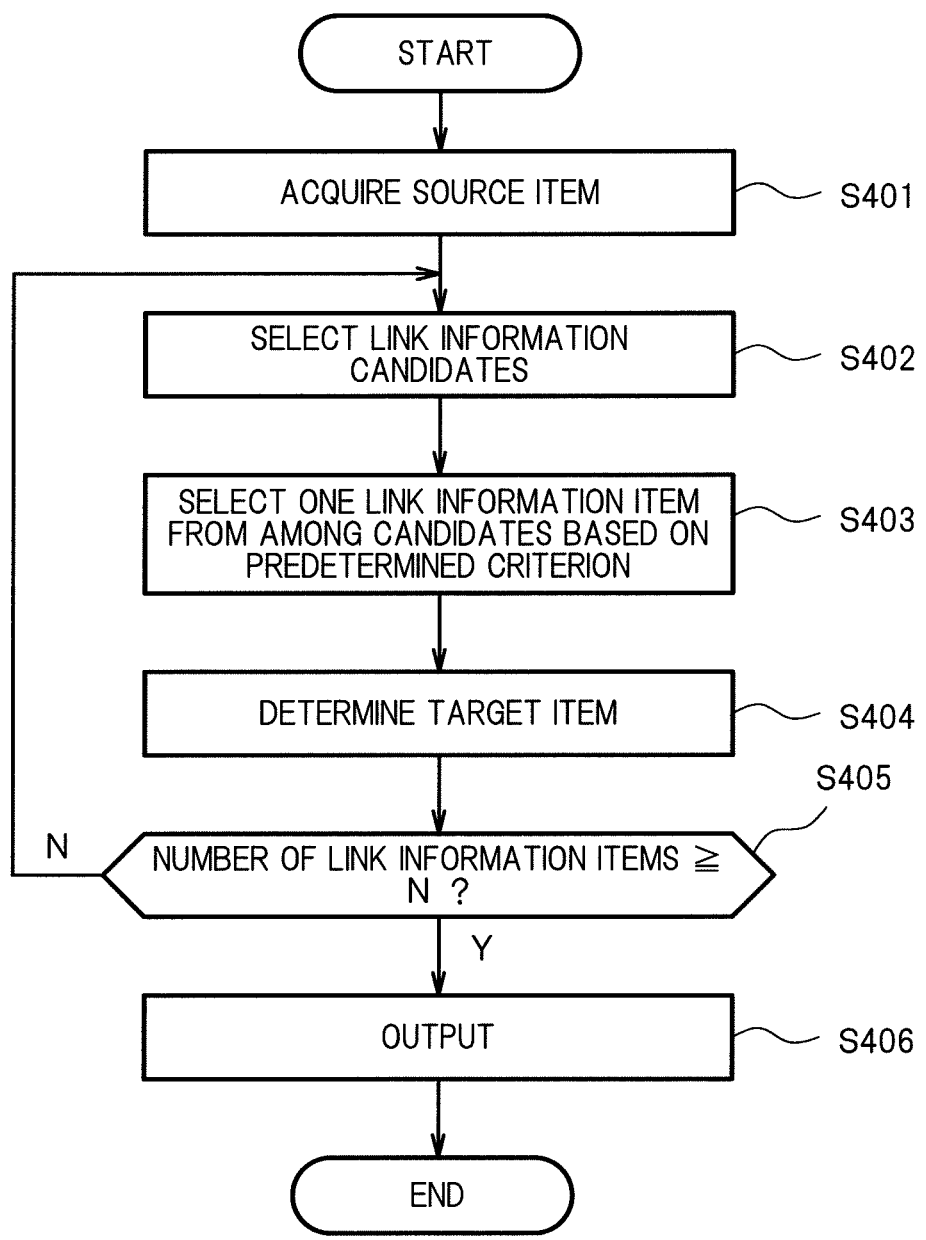
FIG. 4 is a flow chart illustrating processing of a related item introduction program.

FIG. 4 is a flow chart illustrating introduction screen generation processing performed by the related item introduction program 12c. As illustrated in FIG. 4, the name of an item purchased by the user is first acquired as the "source item" (S401). Next, link information items in which that name is set in the entry of the "source item" are read out from the database 14 (S402). Then, based on a predetermined criterion, one link information item is selected from among the link information items read out in S402 (S403). Here, when one link information item is read out in S402, the one link information item is selected. On the other hand, when a plurality of link information items are read out in S402, a degree of relevance (first degree of relevance) is calculated between the user's attribute data (including sex, taste, and age) transmitted in advance from the user computer 16 and the "attribute data" contained in each of the link information items, whereby a link information item having a higher degree of relevance is selected by priority. In this manner, it is possible to realize such conversion of item names that convinces the user. It should be noted that by conversely selecting a link information item having a lower degree of relevance by priority, conversion which is unexpected to the user may also be performed. Here, in the database 14, attribute data is stored in advance for each item. By calculating a degree of relevance (second degree of relevance) between the attribute data of the user and the attribute data of the "target item" contained in each link information item, a link information item having a higher degree of relevance is selected by priority. In this manner, it is possible to realize conversion into an item name which is expected to attract higher interest from the user. Further, a link information item, in which an item name other than item names stored in the entries of the "source item" and the "target item" of the link information items which have already been selected in previous S403 is stored in the entry of the "target item", is selected by priority. In this manner, it is possible to prevent a problem where an item purchased by the user themselves or an item which has already been selected as the "target item" halfway through the processing is eventually introduced as the related item.

Next, a name stored in the entry of the "target item" of the link information item thus selected is acquired (S404). Then, it is judged whether or not the number of times a series of the processing from S402 to S404 has been executed is equal to or larger than N ($\geqq 2$) (S405). When the number of times is less than N, the processing from S402 to S404 is executed again. It should be noted that in S402, a link information item in which the name acquired as the "target item" in S404 which precedes S402 is set as the "source item" is selected (S402). Then, when the number of times the series of the processing from S402 to S404 has been executed becomes equal to or larger than N, by using a name eventually determined in S404 and the link information items selected in the processing of S403 which has been performed N times, the introduction screen exemplified in FIG. 3 is generated, and then transmitted to the user computer 16 (S406).

In this manner, it becomes possible to present a name of a related item which offers unexpected interest to the user as well, while maintaining some relevance to an item purchased by the user.

[Second Embodiment]

Next, a second embodiment of the present invention will be described. A system according to the second embodiment of the present invention is different from the system according to the first embodiment of the present invention in that changes are made to the link information generation program 12a and the related item introduction program 12c, and in that a change is made to the link information stored in the database 14. The remainder is similar to the system of the first embodiment of the present invention, and hence detailed description thereof is omitted herein.

In the second embodiment of the present invention, link information illustrated in FIG. 5 is stored in the database 14. A link information item is configured associating with one another a link ID, source information, an item flag indicating whether or not the source information is an item name, target information, an item flag indicating whether or not the target information is an item name, an explanation, and attribute data. The link ID, the explanation, and the attribute data are similar to those of the first embodiment of the present invention. As the source information and the target information, an item name may be stored as in the case of the first embodiment of the present invention, and also, a character string other than an item name, such as place name, season name, calendar information such as calendar event's name or season name, or a known-person's name, may be stored. When an item name is stored, "1" is also set as the item flag, whereas when a name other than an item name is stored, "0" is set as the item flag. Similarly to the case of the first embodiment of the present invention, the link information generation program 12a according to the second embodiment of the present invention accesses such various kinds of computers as the news site 18, the blog site 20, and the electronic commerce site 22 to thereby collect various analysis object information therefrom. Then, based on the collected analysis object information, the link information generation program 12a generates a large number of link information items which link information items to one another, and stores those link information items in the database 14. For example, the analysis object information is searched for such a text that one character string and another character string are used within a predetermined number of characters or words. Then, when such a text is present, data which has not been used yet is newly generated and set as the "link ID", with one of the two information items being the "source information" and the other being the "target information". Further, the retrieved text is set as the "explanation". Then, based on whether or not the "source information" and the "target information" are item names, the item flags are respectively set. It should be noted that the link information items do not need to be generated automatically by the program, and some or all of them may be set manually.

Figure 6:
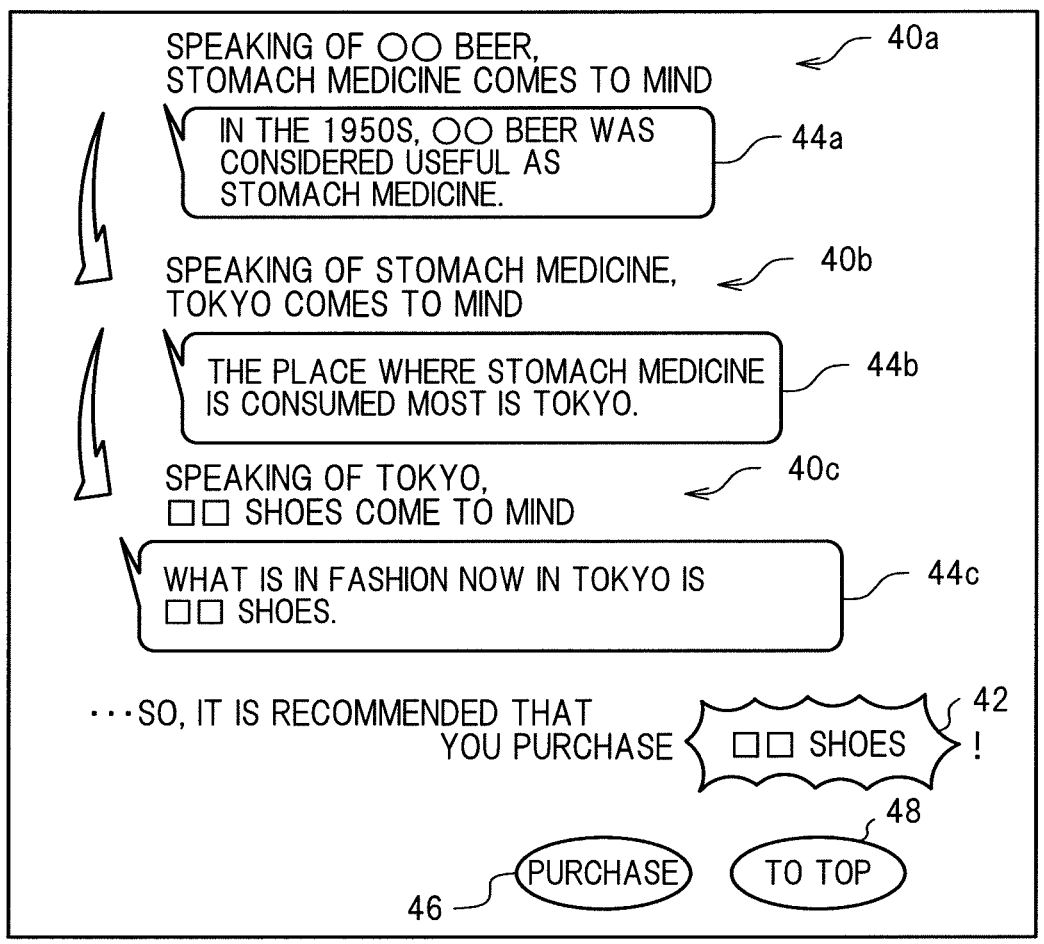
FIG. 6 is a diagram illustrating a modification example of the introduction screen.

When the user purchases an item, the related item introduction program 12c selects an item indirectly related to the item in accordance with the link information items illustrated in FIG. 5, and presents the selected item to the user. FIG. 6 is an example of an introduction screen which is displayed on a display of the user computer 16 and presented to the user. As illustrated in FIG. 6, the introduction screen includes a plurality of link texts 40a-40c each reading "Speaking of . . . , . . . comes to mind", explanatory texts 44a-44c which are respectively displayed below each of the link texts 40a-40c and each indicate a detailed description for the link texts 40a-40c, and a related item name 42 indicating an item which the user is eventually recommended to purchase. The introduction screen further includes a purchase button 46 which is to be pressed when the user purchases the item indicated by the related item name 42, and a return ("TO TOP") button 48 which is to be pressed when the user does not purchase the item. The related item introduction program 12c searches for a link information item in which the item purchased by the user is set in the entry of the "source information", and then reads out the entry of the "target information" of the link information item. Further, the related item introduction program 12c searches for a link information item in which the read-out character string is set in the entry of the "source information", and then reads out the entry of the "target information" of the link information item. In this manner, the link information items are applied repeatedly until information selected in advance based on predetermined criteria is acquired as the "target information" to convert information, whereby information eventually acquired, that is, the information selected in advance, is determined as an item indirectly related to the item purchased by the user.

As the related item name 42 of the introduction screen, the information thus determined is embedded. Each of the link texts 40a is generated using the character strings set in the entries of the "source information" and the "target information" of the link information item used for the conversion of the information. Each of the explanatory texts 44a is generated using a text set in the entry of the "explanation" of the link information item.

Figure 7:
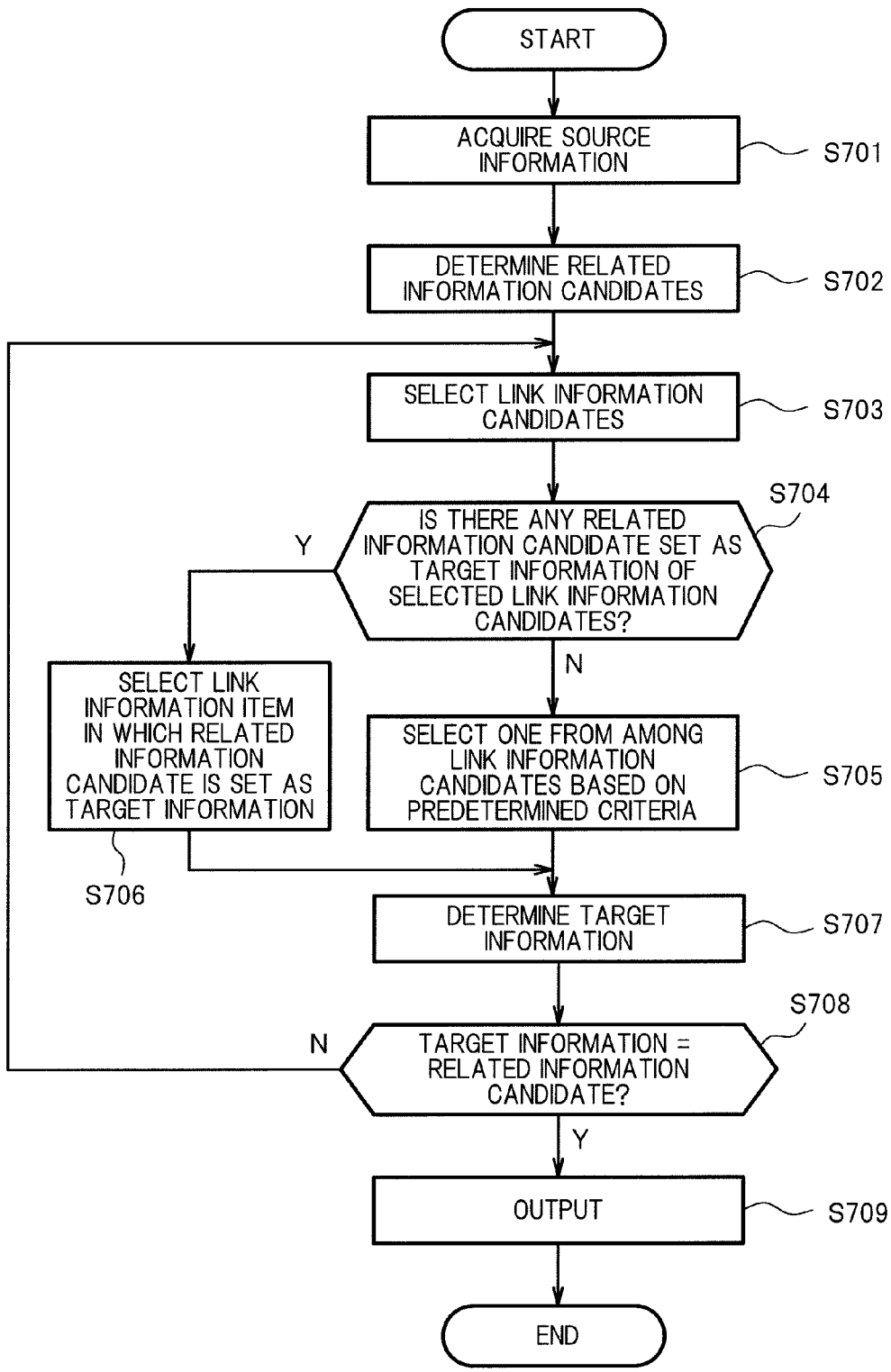
FIG. 7 is a flow chart illustrating processing of a related item introduction program according to the modification example.

FIG. 7 is a flow chart illustrating introduction screen generation processing performed by the related item introduction program 12c. As illustrated in FIG. 7, the name of an item purchased by the user is first acquired as the "source information" (S701). Further, a plurality of item names which are to be eventually selected as the related items are determined based on the predetermined criteria (S702). For example, those item names include the name of an item which an administrator of the electronic commerce server 12 currently particularly wants to sell, and the name of an item which is considered to be o interest to the user based on the attribute data of the user. Next, link information items in which the information acquired in S701 is set in the entry of the "source information" are readout from the database 14 (S703). Then, it is judged whether or not, among the link information items read out in the above-mentioned manner, there is any link information item in which any one of the item names determined in S702 is set as the "target information" (S704). When such a link information item is present, that link information item is selected (S706). On the other hand, when such a link information item is not present, based on the predetermined criteria, one link information item is selected from among the link information items read out in S703 (S705). Here, when one link information item is read out in S703, the one link information item is selected. On the other hand, when a plurality of link information items are read out in S703, a link information item which has the above-mentioned first degree of relevance set higher, or has the above-mentioned second degree of relevance set higher, is selected by priority. Further, a link information item, in which information other than information stored in the entries of the "source information" and the "target information" of the link information items which have already been selected in previous S705 is stored in the entry of the "target information", is selected by priority.

Next, a character string stored in the entry of the "target information" of the link information item thus selected is acquired (S707). Then, it is judged whether or not the character string acquired in S707 is among the names of the related items, which are acquired in S702 (S708). When the character string is not among the names of the related items, the processing from S703 to S708 is executed again. It should be noted that in S703, a link information item in which the character string acquired as the "target information" in S707 which precedes S703 is set as the "source information" is selected. Then, when a character string determined in S707 corresponds to any one of the names of the related items, by using an item name eventually determined in S707 and the link information items selected in the processing of S705 and S706, the introduction screen exemplified in FIG. 6 is generated, and then transmitted to the user computer 16 (S709). In this manner, it becomes possible to introduce any item to the user while showing some relevance to the item purchased by the user.

It should be noted that the present invention is not limited to the above-mentioned embodiments, and various modifications may be made. For example, in the embodiments described above, a link information item links one information item before conversion ("source item" or "source information") to one information item after conversion ("target item" or "target information"), but there may be a plurality of information items before conversion and/or a plurality of information items after conversion, which are linked to each other using the link information item. In addition, there is no need to discriminate between information items before and after conversion.

Further, such a configuration may be employed in which an item having too high a relevance or too low a relevance to the item purchased by the user is not introduced to the user as a related item. For example, between S405 and S406 of FIG. 4, a degree of relevance may be calculated between the item purchased by the user and the item eventually selected in S404. Then, when the relevance is too high (when the degree of relevance is equal to or larger than a first predetermined value) or when the relevance is too low (the degree of relevance is less than a second predetermined value (<first predetermined value)), the processing may be configured to return to S402 again. In this manner, it becomes possible to introduce an unexpected item to the user, and avoid introducing an item which is obviously of no interest of the user.

Further, in the description made above, only an item which is stored in the entry of the "target item" or the "target information" of an eventually-applied link information item is recommended to the user. However, the "target item" or the "target information" (only when the item flag is "1") of a link information item acquired halfway through the processing may be recommended to the user. Further, by calculating a degree of relevance between the item purchased by the user and the related item eventually selected, control may be performed as to whether or not to recommend the related item in accordance with the degree of relevance. For example, when the degree of relevance is equal to or larger than a fixed value (when the relevance is high), it is judged that the related item lacks unexpectedness for the user, and hence the item is not displayed in the entries of the related item name 32 and 42.

Further, the following configuration may be employed. The link information items are managed by type of analysis object information, which is used as a basis of the link information items. One type of the analysis object information is selected based on the user's attribute, and then the link information items managed correspondingly to that type are applied, whereby a related item for the item purchased by the user is selected. In this case, by selecting such an analysis object information type that matches the user's attribute, information conversion which convinces the user may be performed. Alternatively, by selecting such an analysis object information type that does not match the user's attribute, information conversion which is unexpected to the user may be performed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A related information presentation system, comprising:
link information storage means for storing a plurality of link information items in a database, wherein each of the link information items in the database is associated with at least one other link information item;
information acquisition means for acquiring, from a user, an information item which serves as a base point;
link information application means for selecting an information item stored in the link information storage means related to a given information item;
related information selection means for selecting an information item which is indirectly related to the information item which serves as a base point acquired by the information acquisition means by utilizing the link information application means a plurality of times,
wherein the information item acquired by the information acquisition means is used as the given information item a first time the link information application means is utilized by the related information selection means, and
wherein, for each of a subsequent plurality of times the link information application means is utilized by the related information selection means, the selected information item output from a previous utilization of the link information application means is used as the given information item; and
information presentation means for presenting to the user on a display the information item selected by the related information selection means, wherein the information presentation means presents, concurrently, all of the information items selected by the link information application means in the order that the information items were selected by the link information application means, and wherein the information presentation means presents text linking each of subsequently presented information items to the previously presented information item.

2. A related information presentation system according to claim 1, further comprising:

attribute information storage means for storing attribute information in association with each of the plurality of link information items;

attribute degree of relevance calculation means for calculating a degree of relevance between the user and the attribute information; and first link information selection means for selecting, based on the degree of relevance calculated by the attribute degree of relevance calculation means, the link information item which is applied by the link information application means.

3. A related information presentation system according to claim 1, further comprising:

information degree of relevance calculation means for calculating a degree of relevance between the user and an information item which is related, by each of the plurality of link information items, to the given information item; and second link information selection means for selecting, based on the degree of relevance calculated by the information degree of relevance calculation means, the link information item which is applied by the link information application means.

4. A related information presentation system according to claim 1, further comprising:

text information storage means for storing text information in association with at least some of the plurality of link information items; and text information presentation means for presenting, to the user, the text information which is associated with the at least some of the plurality of link information items to be applied by the link information application means.

5. A related information presentation system according to claim 1, further comprising priority presentation information acquisition means for acquiring at least one priority presentation information item, wherein the related information selection means uses the link information application means repeatedly until the at least one priority presentation information item is reached, and selects the at least one priority presentation information item as the information item which is indirectly related to the information item acquired by the information acquisition means.

6. A related information presentation method, comprising:

an information acquisition step of acquiring, from a user, an information item which serves as a base point;

a link information application step of selecting an information item related to a given information item from a link information storage means, wherein the link information storage means stores a plurality of link information items in a database, wherein each of the link information items in the database is associated with at least one other link information item;

a related information selection step of selecting an information item which is indirectly related to the information item which serves as a base point acquired in the information acquisition step by executing the link information application step a plurality of times, wherein the information item acquired by the information acquisition step is used as the given information item utilized a first time the link information application step is executed by the related information selection step, and wherein fore each of the subsequent plurality of times the link information application step is executed by the related information selection step, the selected information item output from a previous execution of the link information application step is used as the given information item; and an information presentation step of presenting to the user on a display the information item selected in the related information selection step, wherein the information presentation step further presents, concurrently, all of the information items selected by the link information application step in the order that the information items were selected by the link information application step, and wherein the information presentation step further presents text linking each of the subsequently presented information items to the previously presented information item.

7. A non-transitory information storage medium recorded with a program for causing a computer to function as:

information acquisition means for acquiring, from a user, an information item which serves as a base point;

link information application means for selecting an information item related to a given information item from a link information storage means, wherein the link information storage means stores a plurality of link information items in a database, wherein each of the link information items stored in the database is associated with at least one other link information item;

related information selection means for selecting an information item which is indirectly related to the information item which serves as a base point acquired by the information acquisition means by utilizing the link information application means a plurality of times, wherein the information item acquired by the information acquisition means is used as the given information item a first time the link information application means is utilized by the related information selection means, and wherein, for each of a subsequent plurality of times the link information application means is utilized by the related information selection means, the selected information item output from a previous utilization of the link information application means is used as the given information item; and information presentation means for presenting to the user on a display the information item selected by the related information selection means, wherein the information presentation means presents, concurrently, all of the information items selected by the link information application means in the order that the information items were selected by the link information application means, and wherein the information presentation means presents text linking each of the subsequently presented information items to the previously presented information item.

8. The related information presentation system according to claim 7, wherein the link text for each of the presented information items describes a relationship to the previously presented information item.

9. The related information presentation system according to claim 1, wherein the related information selection means automatically utilizes the link information application means a plurality of times.

10. The related information presentation method according to claim 6, wherein the related information selection step automatically executes the link information application step a plurality of times.

11. The information storage medium recorded with a program according to claim 7, wherein the related information selection means automatically utilizes the link information application means a plurality of times.

* * * * *